(12) United States Patent
Kang et al.

(10) Patent No.: US 12,215,683 B2
(45) Date of Patent: Feb. 4, 2025

(54) METHOD OF DIAGNOSING ABNORMALITY OF SENSORLESS CONTROL OF MOTOR FOR AIR COMPRESSOR

(71) Applicants: Hyundai Motor Company, Seoul (KR); Kia Corporation, Seoul (KR)

(72) Inventors: Min Su Kang, Gyeonggi-do (KR); Joo Yeon Kim, Seoul (KR); Sung Do Kim, Seoul (KR); Chang Seok You, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 121 days.

(21) Appl. No.: 17/960,306

(22) Filed: Oct. 5, 2022

(65) Prior Publication Data

US 2023/0131865 A1  Apr. 27, 2023

(30) Foreign Application Priority Data

Oct. 21, 2021 (KR) .......... 10-2021-0140647

(51) Int. Cl.
  *H02P 29/20* (2016.01)
  *F04B 35/04* (2006.01)
  *F04B 49/06* (2006.01)
  *F04B 49/20* (2006.01)
  *H02P 6/20* (2016.01)

(52) U.S. Cl.
  CPC .......... *F04B 49/065* (2013.01); *F04B 35/04* (2013.01); *F04B 49/20* (2013.01); *F04B 2203/0209* (2013.01)

(58) Field of Classification Search
  CPC ................ H01M 6/006; H02P 6/18
  See application file for complete search history.

(56) References Cited

U.S. PATENT DOCUMENTS

| | | | |
|---|---|---|---|
| 2005/0162114 A1* | 7/2005 | Makaran | H02P 7/2805 318/434 |
| 2006/0119302 A1* | 6/2006 | Yang | H02P 29/02 318/434 |
| 2006/0201726 A1* | 9/2006 | Won | H02P 6/20 318/727 |
| 2020/0144643 A1 | 5/2020 | Kim et al. | |

FOREIGN PATENT DOCUMENTS

| KR | 2021-0011110 A | 2/2021 |
|---|---|---|
| KR | 2021-0041712 A | 4/2021 |

* cited by examiner

*Primary Examiner* — Kawing Chan
*Assistant Examiner* — Charles S Laughlin
(74) *Attorney, Agent, or Firm* — Fox Rothschild LLP (57) ABSTRACT

Proposed is a method of diagnosing abnormality of sensorless control of a motor for an air compressor, the method including estimating a speed of a motor in real time when a motor starts determining whether or not a preset condition for activating a function of diagnosing abnormality of sensorless control is satisfied, from a slope of the estimated speed of the motor performing control for decreasing an amount of electric current to be applied to the motor, in a case where the preset condition is satisfied computing an amount of decrease in the slope of the estimated speed of the motor while the amount of the electric current is decreased; and determining whether or not the sensorless control fails, by comparing the amount of the decrease in the slope of the speed of the motor with a preset value for confirming diagnosis of the abnormality of the sensorless control.

8 Claims, 5 Drawing Sheets

METHOD OF DIAGNOSING ABNORMALITY OF SENSORLESS CONTROL OF MOTOR FOR AIR COMPRESSOR

CROSS REFERENCE TO RELATED APPLICATION

The present application claims under 35 U.S.C. § 119(a) the benefit of and priority to Korean Patent Application No. 10-2021-0140647, filed Oct. 21, 2021, the entire disclosure of which is incorporated herein by reference.

BACKGROUND

1. Field

The present disclosure relates to a method of diagnosing abnormality of sensorless control of a motor for an air compressor. More particularly, the present disclosure relates to a method of diagnosing abnormality of sensorless control of a motor for an air compressor, the method being capable of quickly determining a failure in sensorless control including positional alignment control of a rotor and of interrupting control of driving of a motor when the sensorless control fails.

2. Description of the Related Art

A fuel cell system that is mounted in a hydrogen fuel cell vehicle that is one of environment-friendly vehicles includes a fuel cell stack, a hydrogen supply device, an air supply device, a heat and water management system, and a controller (fuel cell control unit (FCU)). The fuel cell stack generates electric energy from electrochemical reactions of reactant gases (that is, hydrogen as a fuel gas and oxygen as an oxidant gas). The hydrogen supply device supplies hydrogen that is the fuel gas, to the fuel cell stack. The air supply device supplies air containing oxygen, to the fuel cell stack. The heat and water management system control an operating temperature of the fuel cell stack and perform a water management function. The controller controls an overall operation of the fuel cell system.

In the fuel cell system, the hydrogen supply device includes a hydrogen storage unit (a hydrogen tank), a regulator, a hydrogen supply line, a hydrogen pressure control valve (also referred to as a "hydrogen supply valve"), a hydrogen pressure sensor, a hydrogen recirculation unit, and the like. In addition, the air supply apparatus includes a filter, an air blower, an air compressor, a humidifier, and the like. The heat and water management system includes an electrically powered water pump (coolant pump), a water tank, a radiator, a 3-way valve, a water trap, a drain valve, and the like.

In addition, the controller (fuel cell control unit (FCU)) controls the degree of opening of a hydrogen pressure valve and thus controls a hydrogen operating pressure. The fuel cell control unit controls driving of the air compressor or the air blower and controls other valves within the system.

Recently, the performance of fuel cell vehicles has been much more improved, and thus there is a trend to increase a required output of the fuel cell stack that is a power source for the vehicle. Accordingly, there is also a trend to increase an air compression ratio and a required amount of air flow in the air compressor supplying air to the fuel cell stack. To this end, there is a need to increase a maximum speed of a motor that is driven for air compression in the air compressor.

For positional control of the motor, the air compressor includes a Hall sensor that is a positional sensor. The Hall sensor is susceptible to heat. As a result, as a speed of the motor of the air compressor increases, an amount of heat generated in the motor increases. The increase in the speed of the motor 2 may cause a situation wherein the use of the Hall sensor is restricted.

For this reason, instead of using the Hall sensor, there is a need to develop a technology for sensorless control. Accordingly, control devices have been developed that perform the sensorless control to drive and control the motor of the air compressor without the Hall sensor.

Examples of Patent Documents related to the sensorless control of the motor of the air compressor include Korean Patent Application Publication Nos. 10-2021-0041712 (Apr. 16, 2021) and 10-2021-0011110 (Feb. 1, 2021). With a known sensorless control method, a positional alignment control of the motor of the air compressor is performed, and thus an initial position of a rotor is identified. Then, the motor starts to be driven.

However, the initial position of the rotor may not be normally identified through the positional alignment control due to restraint of the rotor of the motor or due to improper application of electric current. In this state, in a case where the motor starts to be driven, the control fails, and an estimated speed of the motor is divergently applied.

The foregoing is intended merely to aid in the understanding of the background of the present disclosure, and is not intended to mean that the present disclosure falls within the purview of the related art that is already known to those skilled in the art.

SUMMARY OF THE DISCLOSURE

An objective of the present disclosure is to provide a method of diagnosing abnormality of sensorless control of a motor for an air compression, the method being capable of quickly determining a failure in sensorless control and interrupting control of driving of a motor when the sensorless control fails. It is difficult to determine in advance before the motor is driven whether or not positional alignment control succeeds. An estimated speed of the motor is divergently applied in a case where the positional alignment control fails. For this reason, there is a need to quickly determine the failure in the sensorless control and to interrupt the control of the driving of the motor when the sensorless control fails.

According to an aspect of the present disclosure, there is provided a method of diagnosing an abnormality of sensorless control of a motor for an air compressor, the method including: estimating, by a controller, a speed of a motor of an air compressor in real time and beginning when the motor starts; determining, by the controller, whether or not a preset condition for activating a function of diagnosing abnormality of sensorless control is satisfied, from a slope of the estimated speed of the motor; performing, by the controller and in a case where the preset condition is satisfied, a control operation for decreasing an amount of electric current to be applied to the motor; computing, by the controller and in a case where the control operation for decreasing an amount of electric current is performed, an amount of decrease in the slope of the speed of the motor, the speed being estimated in real time; and determining, by the controller, whether or not the sensorless control fails by comparing the amount of the decrease in the slope of the speed of the motor against a preset value for confirming diagnosis of the abnormality of the sensorless control.

Accordingly, with the method of diagnosing abnormality of sensorless control of a motor for an air compressor, immediately after the motor starts, it can be diagnosed, on the basis of the slope with which the estimated speed of the motor is increased, whether or not the sensorless control fails. Then, an attempt can be made to restart the motor. In addition, a speed command value that is transferred from a controller at a higher level than the controller can be quickly received, and the motor can be rapidly restarted. Thus, a quick corrective response can be taken in such a manner that a fuel cell vehicle is drivable.

In addition, according to the present disclosure, the function of diagnosing the abnormality of the sensorless control can be additionally performed in a simple manner through a software logic while maintaining an existing hardware configuration of a control device without any change thereto. Therefore, the advantage of adding a new function to an air supply device of a fuel cell system of the fuel cell vehicle can be achieved.

In additional embodiments, the preset condition for activating the function of diagnosing the abnormality of the sensorless control is set to be a condition that the slope of the estimated speed of the motor is at or above a preset reference value for diagnosing the abnormality of the sensorless control.

In additional embodiments, the performing of the control operation for decreasing the amount of the electric current to be applied to the motor step further includes: decreasing, by the controller, an electric-current command value by using a preset slope thereby decreasing an amount of electric current applied to the motor through an inverter based on the electric-current command value.

In additional embodiments, the determining whether or not the sensorless control fails step further includes: determining if the amount of the decrease in the slope of the speed of the motor is less than or equal to the preset value for confirming the diagnosis of the abnormality of the sensorless control. In some embodiments, if the speed of the motor is less than or equal to the preset value the controller determines that the sensorless control is in a failed state.

In additional embodiments, if it is determined that the sensorless control is in a failed state, the controller further performs the steps of: interrupting driving of the motor; reperforming positional alignment control of the motor; and restarting of the motor.

In additional embodiments, when restarting of the motor is performed, the controller: repeatedly performs the estimating of the speed of the motor in real time; repeatedly performs the determining of whether or not the condition of activating the function of diagnosing the abnormality of the sensorless control in real time; repeatedly performs the performing of the control for decreasing the amount of the electric current to be applied to the motor in real time; repeatedly performs the computing of the amount of the decrease in the slope of the speed of the motor in real time, and repeatedly performs the determining of whether or not the sensorless control fails. In some embodiments, in a case where it is determined by the controller that the sensorless control is in a normal state, a normal control of the driving of the motor is performed.

In various embodiments, in a case where the amount of the decrease in the slope of the speed of the motor exceeds the preset value for confirming the diagnosis of the abnormality of the sensorless control, the controller determines that the sensorless control is in a normal state and performs normal control of the driving of the motor.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Embodiments of the present disclosure will be described below with reference to the illustrations in terms of specific structures and functions. Various embodiments are conceivable without departing from the nature and gist of the present disclosure. The present disclosure should not be construed as being limited to embodiments described in the present specification. All alterations, equivalents, and substitutes that are included within the technical idea of the present disclosure should be understood as falling within the scope of the present disclosure.

In the present specification, the terms first, second, and so on are used to describe various constituent elements, but these elements are not limited to those terms. Those terms are only used to distinguish one constituent element from another. For instance, a first constituent element may be termed a second constituent element without departing from the scope of each claim that defines the present disclosure. Likewise, the second constituent element may also be termed the first constituent element.

It should be understood that a constituent element, when referred to as being "coupled to" or "connected to" a different constituent element, may be directly coupled to or directly connected to the different constituent element or may be coupled to or connected to the different constituent element with an intervening constituent element being interposed therebetween. In contrast, it should be understood that a constituent element, when referred to as being "directly coupled to" or "directly connected to" a different constituent element, is coupled to or connected to the different constituent element without any intervening constituent element being interposed therebetween. Expressions such as "between" and "directly between" and expressions "adjacent to" and "directly adjacent to" that are used for describing a relationship between constituent elements should be construed in the same manner.

Like reference numerals depict like constituent elements throughout the present specification. The terms used throughout the present specification serve the purpose of describing embodiments and do not impose any limitation on the present disclosure. Unless specified otherwise through the present specification, a singular noun or a singular noun phrase may have a plural meaning. The terms "comprise" and/or "comprising" are intended to indicate that named constituent elements, steps, operations, and/or elements are present, without precluding the presence or addition of one or more other constituent elements, steps, operations, and/or elements.

Embodiments of the present disclosure will be described below with reference to the accompanying drawings.

Figure 1:
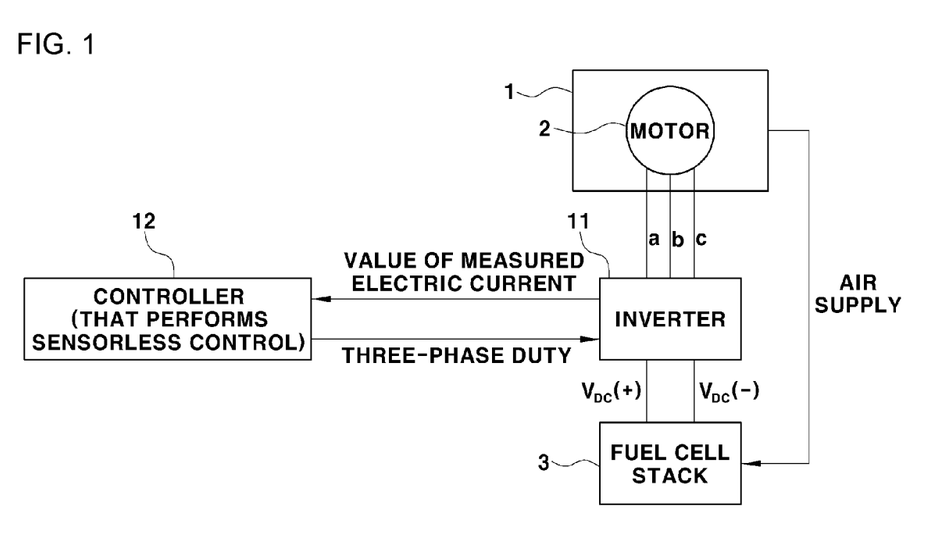
FIG. 1 is a schematic block diagram illustrating a configuration of a control device according to the present disclosure that performs an abnormality diagnosis process according to the present disclosure.

FIG. 1 is a schematic block diagram illustrating a configuration of a control device according to the present disclosure that performs an abnormality diagnosis process according to the present disclosure. The control device illustrated in FIG. 1 performs not only sensorless control of a motor 2 of an air compressor 1, but also a process of diagnosing the motor 2 thereof to determine whether or not the sensorless control fails.

According to the present disclosure, an abnormal state of the sensorless control means a control failure state where the sensorless control of the motor 2 of the air compressor 1 is not normally performed. In addition, according to the present disclosure, the abnormal state of the sensorless control includes a state where the motor 2 is driven without properly performing positional alignment control of the motor 2 when the motor 2 starts.

Along with the control device, the motor 2 of the air compressor 1 and a fuel cell stack 3 are illustrated in FIG. 1. The fuel cell stack 3 is supplied by the air compressor 1 with air that is an oxidant gas. The air compressor 1 serves the purpose of supplying air, necessary to generate electricity, to the fuel cell stack 3 of a fuel cell system. The motor 2 is hereinafter referred to as the motor 2 of the air compressor 1.

In addition, an actual speed of the motor 2 is hereinafter described as having the same meaning as a speed of a rotor and, more particularly, as an actual rotational speed (an angular speed) of the rotor that is a rotational component among components of the motor 2. Instead of when the sensorless control is performed, when control is performed using a Hall sensor, the actual speed of the motor 2 is measured, and the actual speed of the motor 2 is obtained from a signal of the Hall sensor. In addition, an actual position of the motor 2 is hereinafter described as having the same meaning as an actual rotational position of the rotor. Instead of when the sensorless control is performed, when the control is performed using the Hall sensor, an actual position of the motor 2 is measured by the Hall sensor.

However, a system in which the sensorless control is performed is not equipped with the Hall sensor. Therefore, when driving of the motor 2 is controlled, the estimated speed of the motor 2 is used instead of the actual speed of the motor 2. The estimated speed of the motor 2 is hereinafter described as having the meaning as a rotational speed of a magnetic field that is to be applied to a stator during a sensorless control process. That is, in a case where the motor 2 for the air compressor 1 is a synchronization motor, when the sensorless control is performed without using the Hall sensor, the rotational speed of the magnetic field that is to be applied to the stator is estimated as a speed of the motor 2, and the estimated speed of the motor 2 is used.

The speed of the motor 2 that is estimated in this manner, that is, the estimated speed of the motor 2, is different from the actual speed of the motor that is a speed measured by a sensor. As described below, in a state where the sensorless control of the synchronization motor fails, a difference occurs between the actual speed of the motor 22 (an actual rotational speed of the rotor) and the estimated speed of the motor 2 that is the rotational speed of the magnetic field that is to be applied to the stator.

In an air supply device of the fuel cell system, the air compressor 1 serves the purpose of supplying air that is an oxidant gas, among reactant gases for an electrochemical reaction generating electrical energy, to the fuel cell stack 3. The air compressor 1 is connected to a cathode terminal-side of the fuel cell stack 3 through an air supply line.

The air compressor 1 includes the motor 2, as a drive actuator. The driving of the motor 2 is controlled by the control device. The motor 2 may be the synchronization motor. The control device for controlling the driving of the motor 2 includes an inverter 11 and a controller 12. The inverter 11 applies three-phase electric current to the motor 2. The controller 12 performs duty control on a three-phase switch of the inverter 11.

The inverter 11 is connected to the fuel cell stack 3 that is a high-voltage direct current power source. When the motor 2 is driven, the inverter 11 converts direct current (DC) supplied from the fuel cell stack 3 into three-phase alternating current (AC) and applies the resulting three-phase alternating current to the motor 2 through a power cable.

The controller 12 performs the sensorless control of the motor 2. For the sensorless control, the controller 12 receives a value of measured electric current of the inverter 11, as an input, and estimates a position and a speed of the motor 2. In addition, the controller 12 outputs a three-phase duty signal for a switch within in the inverter 11 on the basis of the estimated position and speed of the motor 2 and performs the sensorless control for driving the motor 2 of the air compressor 1. The sensorless control here means to control the driving of the motor 2 by estimating the position, angle, and speed of the motor 2 without the Hall sensor that is a positional sensor for positional control of the motor 2.

With a known sensorless control method for the motor 2 of the air compressor 1, positional alignment control of the motor 2 of the air compressor 1 is performed, and thus an initial position of the rotor is identified. Then, the motor 2 starts to be driven. However, the initial position of the rotor may not be normally identified through the positional alignment control due to restraint of the rotor of the motor 2 or due to improper application of electric current. In this state, in a case where the motor 2 starts to be driven, rotation of the rotor (rotation of the motor 2) is actually not synchronized to rotation of the magnetic field, and thus the rotor is kept stationary. Accordingly, a counter-electromotive force is not generated, and thus electric current is applied without load on the rotor. Therefore, the rotational speed (the angular speed) of the magnetic field that is to be applied to the stator is divergently applied at a very high speed.

In short, the actual rotational speed of the rotor is 0 rpm (the actual speed of the motor is 0 rpm), the rotational speed of the magnetic field (which is the estimated speed of the motor 2 when the sensorless control is performed) is divergently applied at a very high speed.

Therefore, in order to solve the above-described problem, according to the present disclosure, a method of realizing and additionally performing a function of diagnosing abnormality of the sensorless control through a software logic while maintaining an existing hardware configuration of the control device without any change thereto.

Figure 2:
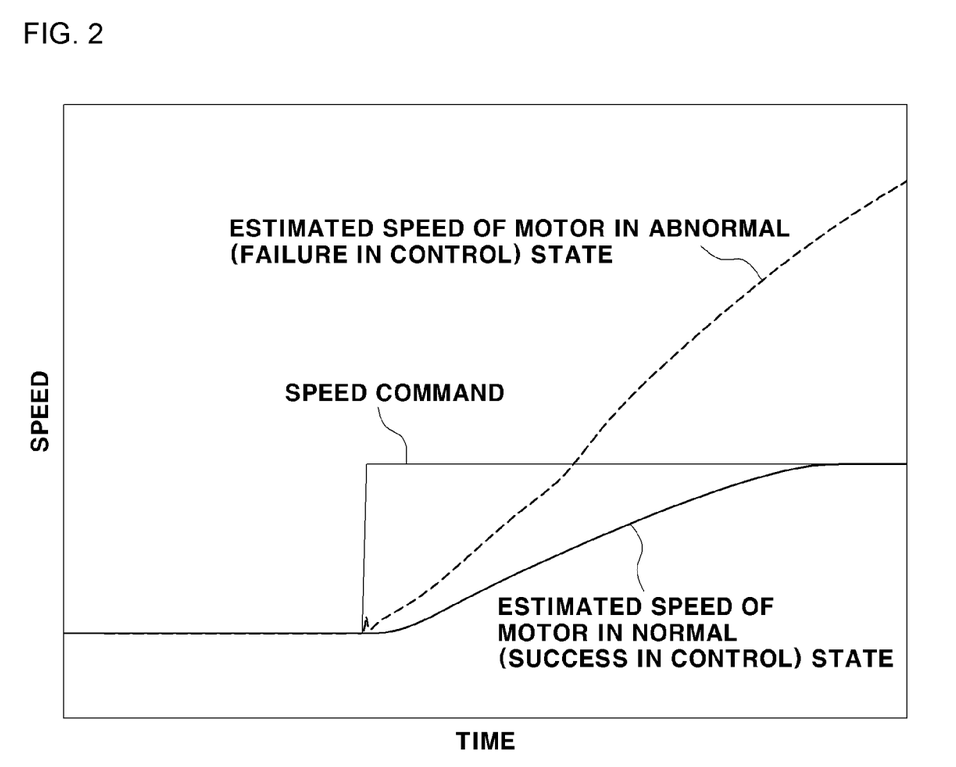
FIG. 2 is a first view illustrating a speed of a motor that is estimated during a sensorless control process according to the present disclosure.
Figure 3:
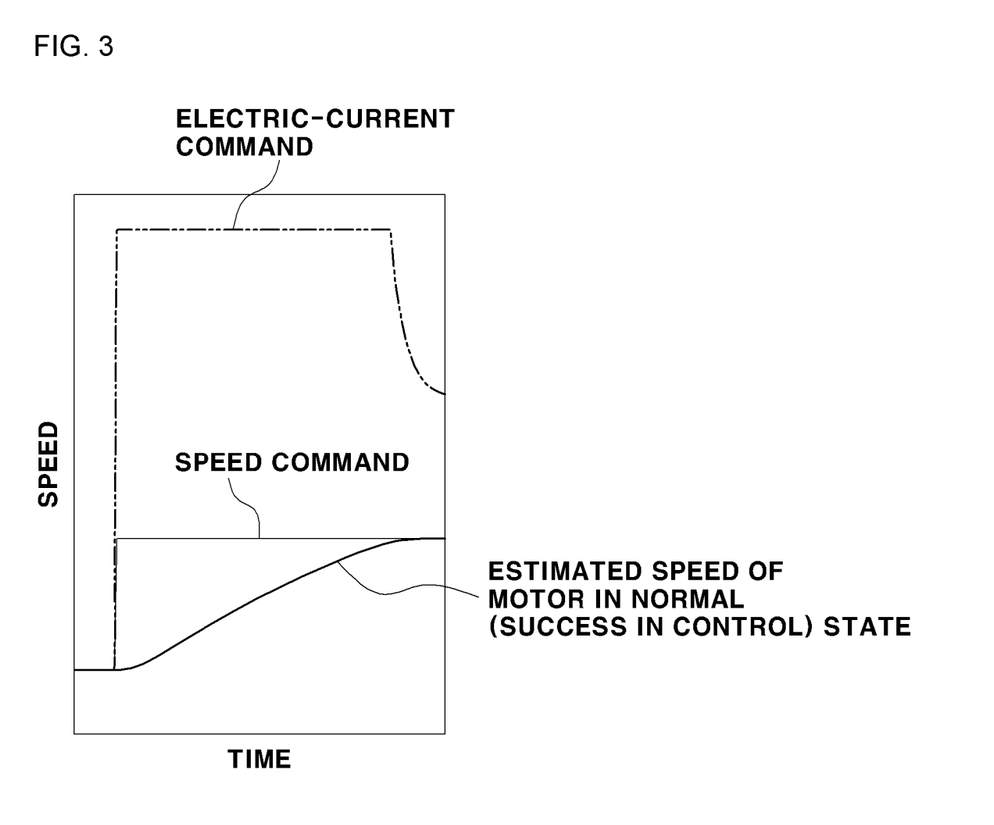
FIG. 3 is a second view illustrating a speed of a motor that is estimated during a sensorless control process according to the present disclosure.
Figure 4:
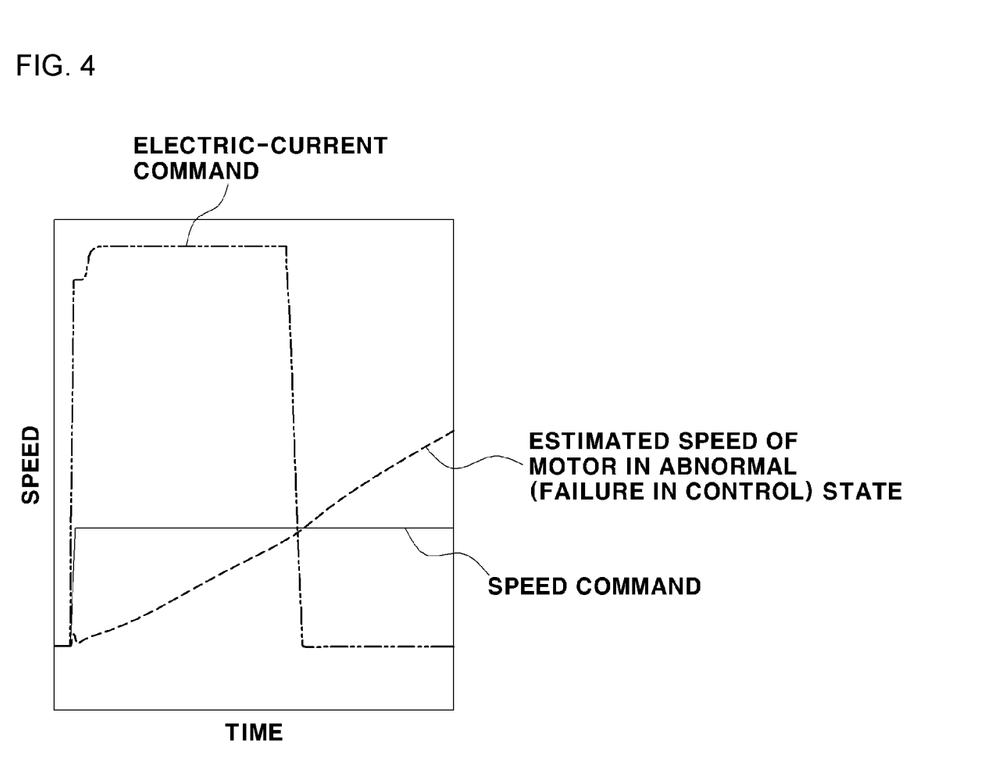
FIG. 4 is a third view illustrating a speed of a motor that is estimated during a sensorless control process according to the present disclosure.

FIGS. 2 to 4 are views each illustrating the speed of the motor 2 that is estimated during the sensorless control process (the estimated speed of the motor 2). FIGS. 2 to 4 illustrate a result of comparison of the speed of the motor 2 in a normal (success in the control) state and the speed of the motor 2 in an abnormal (failure in the control) state. As illustrated, when the motor 2 starts initially, in a case where the motor 2 starts to be driven without the positional alignment control of the rotor being normally performed, the rotational speed of the magnetic field that is to be applied to the stator (the estimated speed of the motor 2) is increased faster with a greater slope than in the normal state.

The reason for this is because the rotor remains stationary without being synchronized to the stator and because electric current is thus applied to the rotor without load thereon. This application increases the estimated speed of the motor 2, which is the rotational speed of the magnetic field that is to be applied to the stator, much more than in the normal state.

When the motor 2 starts initially, it can be seen from FIG. 2 that the estimated speed of the motor 2 is increased with a steeper slope in a case where the sensorless control fails than in a case where the sensorless control succeeds normally.

In addition, in a case where normal sensorless control is performed and where the motor 2 is in a driven state, when the estimated speed of the motor 2 almost reaches a speed command value, as illustrated in FIG. 3, an amount of electric current to be applied is decreased, and thus the estimated speed of the motor 2 naturally converges to the speed command value. However, in a case where the sensorless control fails, as illustrated in FIG. 4, although the amount of electric current to be applied is decreased, the estimated speed of the motor 2 is divergently applied as is.

In the case where the normal sensorless control is performed and where the motor 2 is in the driven state, it can be seen from FIG. 3 that at the same time as an electric-current command value is increased, an amount of change in the estimated speed of the motor 2 is also decreased. However, when the sensorless control fails, although the electric-current command value is decreased, the estimated speed of the motor 2 is divergently applied as is.

According to the present disclosure, the abnormality of the sensorless control is diagnosed using this feature in a case where a slope of the estimated speed of the motor 2 is increased to a predetermined value or higher when the motor 2 is initially driven. In addition, in a case where the abnormality of the sensorless control is diagnosed, a change in the slope of the estimated speed of the motor 2 is checked by decreasing the amount of electric current to be applied to the motor 2 by a predetermined value. At this point, in a case where the estimated speed of the motor 2 is increased as is, without the slope being changed to the predetermined level or higher, it is determined that the sensorless control is in a failed state (in the abnormal state). Then, the driving of the motor 2 is interrupted, and the positional alignment control is reperformed to attempt to restart the motor 2.

Conversely, in a case where a value of the slope with which the estimated speed of the motor 2 is increased is decreased to a predetermined value or higher when the amount of electric current to be applied is decreased, it is determined that the sensorless control is in the normal state (succeeds). Thus, the function of diagnosing the abnormality of the sensorless control is no longer performed, and the normal sensorless control and the motor driving are maintained.

Figure 5:
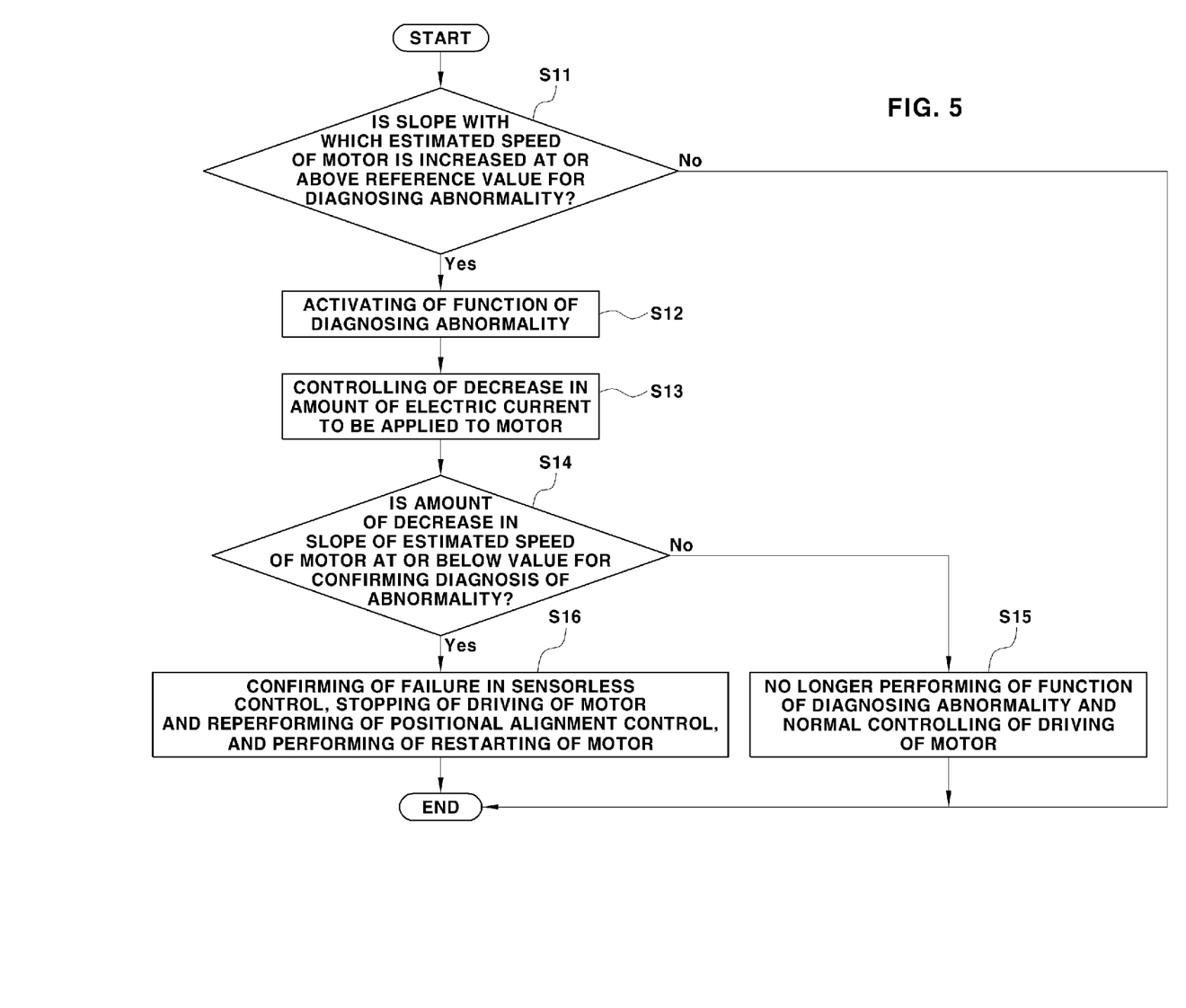
FIG. 5 is a flowchart for an abnormality diagnosis process according to an embodiment of the present disclosure.

FIG. 5 is a flowchart for an abnormality diagnosis process according to an embodiment of the present disclosure.

The controller 12 receives a command value of the speed of the motor 2 that is higher than 0 rpm from a controller at a higher level than the controller 12 and attempts to initially start the motor 2. At this time, the controller 12 performs the function of diagnosing the abnormality of the sensorless control according to the order of steps illustrated in FIG. 5.

First, when initially starting the motor 2, the controller 12 estimates the speed of the motor 2 in real time. In addition, from the speed of the motor 2 estimated in real time (hereinafter referred to the estimated speed of the motor 2), the controller 12 determines whether or not a condition for activating the function of diagnosing the abnormality of the sensorless control is satisfied. At this point, the condition for activating the function of diagnosing the abnormality of the sensorless control may be set to be a condition that the slope of the estimated speed of the motor 2 is at or above a preset reference value for diagnosing the abnormality of the sensorless control.

That is, the controller 12 checks whether or not the estimated speed of the motor 2 is increased with a slope greater than the reference value for diagnosing the abnormality of the sensorless control (S11). In a case where a slope with which the estimated speed of the motor 2 is increased is at or above the reference value for diagnosing the abnormality of the sensorless control, the controller 12 determines that the condition for activating the function of diagnosing the abnormality of the sensorless control is satisfied. Thus, the controller 12 activates the function of diagnosing the abnormality of the sensorless control (S12).

The estimated speed of the motor 2 means the rotational speed of the magnetic field that is to be applied to the stator, as a speed of the motor 2 that is estimated during the sensorless control process. When the sensorless control is performed, the Hall sensor is not used. Therefore, a position of the rotor is not measured by the Hall sensor, but the three-phase electric current to be applied to the motor 2 is measured. The value of the measured electric current, that is, a value of the measured three-phase electric current is input into the controller 12.

In addition, the controller 12 controlling the motor 2 of the air compressor 1 determines the rotational speed of the magnetic field that is to be applied to the stator, using a voltage equation or the like on the basis of the value of the measured electric current, the electric-current command value, and the like. Then, the controller 12 controls the driving of the motor 2 using the determined rotational speed as the estimated speed of the motor 2.

In this manner, when the sensorless control is performed, the rotational speed of the magnetic field that is to be applied to the stator is used as the estimated speed of the motor 2. The rotational speed of the magnetic field that is to be applied to the stator is information that is determined by the controller 12 itself. In addition, the controller 12 determines in real time the rotational speed of the magnetic field that is to be applied to the stator, on the basis of the value of the measured electric or the like. Therefore, the rotational speed of the magnetic field is a value that the controller 12 always recognizes when the sensorless control is performed.

Subsequently, when the function of diagnosing the abnormality of the sensorless control is activated, through the inverter 11, the controller 12 performs control for decreasing the amount of the electric current to be applied to the motor 2 (S13). At this time, the controller 12 decreases the electric-current command value using a preset slope and thus may decrease the amount of electric current to be actually applied to the motor 2. In addition, while the amount of the electric current to be applied to the motor 2 is decreased, the controller 12 checks whether or not the slope of the estimated speed of the motor 2 is in proportion to a slope for the decrease in the amount of electric current.

In a case where the rotor is actually synchronized to the rotation of the magnetic field that is to be applied to the stator and thus is rotated, the counter-electromotive force is generated. Accordingly, the amount of change in the estimated speed of the motor 2 and the slope (a change ratio) are decreased in proportion to the amount of applied electric current. However, in a case where the rotor is kept stationary and where the sensorless control fails, although the amount of electric current to be applied is decreased, the rotor is kept under no load, and thus the amount of change in the estimated speed of the motor 2 and the slope (the change ratio) are not decreased.

As described above, while the amount of the electric current to be applied to the motor 2 is decreased, the controller 12 also continues to compute the estimated speed of the motor 2 in real time. Furthermore, the controller 12 computes the slope of the estimated speed of the motor 2 and at the same time computes an amount of decrease in the slope of the estimated speed of the motor 2 in real time.

In addition, the controller 12 compares the computed amount of the decrease in the slope of the estimated speed of the motor 2 with a preset value for confirming diagnosis of the abnormality of the sensorless control (S14). At this point, in a case where the amount of the decrease in the slope of the estimated speed of the motor 2 exceeds the value for confirming the diagnosis of the abnormality of the sensorless control, the controller 12 determines that the sensorless control is in the normal (success in the control) state. Then, the controller 12 no longer performs the function of diagnosing the abnormality of the sensorless control and then performs normal control of the driving of the motor 2 (S15).

By contrast, in a case where the amount of the decrease in the slope of the estimated speed of the motor 2 is at or below the value for confirming the diagnosis of the abnormality of the sensorless control, the controller 12 determines that the sensorless control fails and is in the abnormal state. When it is determined that the sensorless control is in the abnormal state, the controller 12 interrupts the driving of the motor 2. Then, the controller 12 reperforms the positional alignment control of the motor 2 and restarts the motor 2. During the process of restarting the motor 2, the controller 12 may also repeatedly perform the process in FIG. 5. Only in a case where the sensorless control is in the normal state, the controller 12 may perform the normal control of the driving of the motor 2.

The method of diagnosing the abnormality of the sensorless control according to the present disclosure is described above. In the related art, the sensorless control fails due to the improper performing of the positional alignment control during a process of starting the motor 2 after the positional alignment control is performed. However, in the related art, a process of diagnosing the failure in the sensorless control and a subsequent action to deal with the failure in the sensorless control are not performed. Accordingly, when the sensorless control is performed, the estimated speed of the motor 2 is divergently applied, and thus it may be impossible to drive a fuel cell vehicle.

However, with a method of diagnosing the abnormality of the sensorless control of the motor 2 according to the present disclosure, immediately after started, the motor 2 is quickly diagnosed to determine whether or not the sensorless control fails, on the basis of the slope with which the estimated speed of the motor 2 is increased. Then, an attempt may be made to restart the motor 2. In addition, the speed command value that is transferred from the controller at a higher level than the controller 12 can be quickly received, and the motor 2 can be rapidly restarted. Thus, a quick corrective response can be taken in such a manner that the fuel cell vehicle is drivable.

In addition, according to the present disclosure, the function of diagnosing the abnormality of the sensorless control can be additionally performed in a simple manner through the software logic while maintaining the existing hardware configuration of the control device without any change thereto. Therefore, the advantage of adding a new function to the air supply device of the fuel cell system of the fuel cell vehicle can be achieved.

The embodiments of the present disclosure are described in detail above, but impose no limitation on the claimed scope of the present disclosure. Various modifications and improvements that a person of ordinary skill in the art makes using the fundamental concept of the present disclosure that is defined in the following claims are also included in the claimed scope of the present disclosure.

In some implementations, a "controller" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC) to power one or more components of the controller, and a bus that allows communication among the various disclosed components of the controller.

What is claimed is:

1. A method of diagnosing an abnormality of sensorless control of a motor for an air compressor, the method comprising:
    estimating, by a controller, a speed of the motor of the air compressor in real time and beginning when the motor starts;
    determining, by the controller, whether or not a preset condition for activating a function of diagnosing abnormality of sensorless control is satisfied, from a slope of the estimated speed of the motor;
    performing, by the controller and in a case where the preset condition is satisfied, a control operation for decreasing an amount of electric current to be applied to the motor;
    computing, by the controller and in a case where the control operation for decreasing the amount of electric current is performed, an amount of decrease in the slope of the speed of the motor, the speed being estimated in real time; and
    determining, by the controller, whether or not the sensorless control fails by comparing the amount of the decrease in the slope of the speed of the motor against a preset value for confirming diagnosis of the abnormality of the sensorless control,
wherein if it is determined that the sensorless control is in a failed state, the controller further performs the steps of:
interrupting driving of the motor;
reperforming positional alignment control of the motor; and
restarting of the motor.

2. The method of claim 1, wherein the preset condition for activating the function of diagnosing the abnormality of the sensorless control is set to be a condition that the slope of the estimated speed of the motor is at or above a preset reference value for diagnosing the abnormality of the sensorless control.

3. The method of claim 1, wherein the determining whether or not the sensorless control fails step further comprises:
determining if the amount of the decrease in the slope of the speed of the motor is less than or equal to the preset value for confirming the diagnosis of the abnormality of the sensorless control, wherein if the speed of the motor is less than or equal to the preset value the controller determines that the sensorless control is in a failed state.

4. The method of claim 1, wherein when restarting of the motor is performed, the controller:
repeatedly performs the estimating of the speed of the motor in real time;
repeatedly performs the determining of whether or not the condition of activating the function of diagnosing the abnormality of the sensorless control in real time;
repeatedly performs the performing of the control for decreasing the amount of the electric current to be applied to the motor in real time;
repeatedly performs the computing of the amount of the decrease in the slope of the speed of the motor in real time, and
repeatedly performs the determining of whether or not the sensorless control fails; and
wherein in a case where it is determined by the controller that the sensorless control is in a normal state, a normal control of the driving of the motor is performed.

5. The method according to claim 3, wherein in a case where the amount of the decrease in the slope of the speed of the motor exceeds the preset value for confirming the diagnosis of the abnormality of the sensorless control, the controller determines that the sensorless control is in a normal state and performs normal control of the driving of the motor.

6. The method of claim 3, wherein if it is determined that the sensorless control is in the failed state, the controller further performs the steps of:
interrupting driving of the motor;
reperforming positional alignment control of the motor; and
restarting of the motor.

7. The method of claim 6, wherein when restarting of the motor is performed, the controller:
repeatedly performs the estimating of the speed of the motor in real time;
repeatedly performs the determining of whether or not the condition of activating the function of diagnosing the abnormality of the sensorless control in real time;
repeatedly performs the performing of the control for decreasing the amount of the electric current to be applied to the motor in real time;
repeatedly performs the computing of the amount of the decrease in the slope of the speed of the motor in real time, and
repeatedly performs the determining of whether or not the sensorless control fails; and
wherein in a case where it is determined by the controller that the sensorless control is in a normal state, a normal control of the driving of the motor is performed.

8. The method of diagnosing an abnormality of sensorless control of a motor for an air compressor, the method comprising:
estimating, by a controller, a speed of the motor of the air compressor in real time and beginning when the motor starts;
determining, by the controller, whether or not a preset condition for activating a function of diagnosing abnormality of sensorless control is satisfied, from a slope of the estimated speed of the motor;
performing, by the controller and in a case where the preset condition is satisfied, a control operation for decreasing an amount of electric current to be applied to the motor;
wherein the performing of the control operation for decreasing the amount of the electric current to be applied to the motor step further comprises:
decreasing, by the controller, an electric-current command value by using a preset slope thereby decreasing the amount of electric current applied to the motor through an inverter based on the electric-current command value.

\* \* \* \* \*